(12) United States Patent
Coupard et al.

(10) Patent No.: US 10,147,245 B2
(45) Date of Patent: Dec. 4, 2018

(54) METHOD AND COMPUTER PROGRAM FOR THE MONITORING OF A THRUST REVERSER HAVING HYDRAULIC ACTUATORS

(71) Applicant: SAFRAN AIRCRAFT ENGINES, Paris (FR)

(72) Inventors: Josselin Coupard, Nogent sur Marne (FR); Hang-Mi Tran, Maisons Alfort (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 15/109,714

(22) PCT Filed: Dec. 24, 2014

(86) PCT No.: PCT/FR2014/053556
§ 371 (c)(1),
(2) Date: Jul. 5, 2016

(87) PCT Pub. No.: WO2015/104475
PCT Pub. Date: Jul. 16, 2015

(65) Prior Publication Data
US 2016/0328892 A1    Nov. 10, 2016

(30) Foreign Application Priority Data
Jan. 8, 2014    (FR) ..................................... 14 50114

(51) Int. Cl.
*G07C 5/08*    (2006.01)
*F02K 1/76*    (2006.01)
(Continued)

(52) U.S. Cl.
CPC .......... *G07C 5/0816* (2013.01); *B64D 31/06* (2013.01); *B64D 45/00* (2013.01); *F02K 1/76* (2013.01);
(Continued)

(58) Field of Classification Search
CPC .................. F02K 1/76; G05B 23/0283; G05B 2219/32191; G05B 2219/32201;
(Continued)

(56) References Cited

U.S. PATENT DOCUMENTS

2002/0157376 A1* 10/2002 Ahrendt .................. F02K 1/763
                                                                60/204
2003/0159429 A1* 8/2003 Langston .................. F02K 1/76
                                                                60/226.2
(Continued)

FOREIGN PATENT DOCUMENTS

CN    101815973 A    8/2010
CN    102804307 A    11/2012
(Continued)

OTHER PUBLICATIONS

Office Action dated Apr. 17, 2017, in Chinese Patent Application No. 201480072626.1 (with English language translation).
(Continued)

*Primary Examiner* — Dale Moyer
(74) *Attorney, Agent, or Firm* — Oblon, McClelland, Maier & Neustadt, L.L.P.

(57) ABSTRACT

A method for monitoring an aircraft thrust reverser having stowable doors, the thrust reverser being a reverser having hydraulic actuators equipped with switches arranged to each return a data item on the position of the doors, the engine including a computer configured to make measurements of a representative parameter of the position of the switches based on the data returned by the switches, includes com-
(Continued)

putation of one or a plurality of statistical indicators of the parameter measured and an analysis of the temporal progression of the statistical indicator(s) computed. The invention also applies to a computer program for the implementation of this method.

9 Claims, 2 Drawing Sheets

(51) Int. Cl.
G05B 23/02 (2006.01)
B64D 31/06 (2006.01)
B64D 45/00 (2006.01)

(52) U.S. Cl.
CPC ............ *F02K 1/763* (2013.01); *G05B 23/024* (2013.01); *G05B 23/0283* (2013.01); *B64D 2045/0085* (2013.01); *F05D 2260/80* (2013.01); *F05D 2260/821* (2013.01); *F05D 2270/64* (2013.01); *F05D 2270/821* (2013.01); *G05B 2219/32191* (2013.01); *G05B 2219/32201* (2013.01); *Y02P 90/22* (2015.11); *Y02T 50/671* (2013.01)

(58) Field of Classification Search
CPC ............ G05B 23/024; F05D 2260/80; F05D 2270/64; G05D 2260/821; G05D 2270/821; G07C 5/0816
See application file for complete search history.

(56) References Cited

U.S. PATENT DOCUMENTS

| | | |
|---|---|---|
| 2009/0050452 A1* | 2/2009 | Brose .................. B23K 9/0026 200/293 |
| 2010/0107997 A1 | 5/2010 | Kojima |
| 2010/0242434 A1* | 9/2010 | Bader ...................... F02K 1/76 60/226.2 |
| 2011/0022345 A1 | 1/2011 | Maalioune |
| 2011/0307220 A1* | 12/2011 | Lacaille ............... G05B 23/024 702/185 |
| 2012/0313651 A1 | 12/2012 | Storn |
| 2013/0056554 A1 | 3/2013 | Guillois et al. |
| 2013/0292490 A1 | 11/2013 | Chapelain et al. |
| 2014/0229122 A1* | 8/2014 | Horabin ............ G05B 23/0235 702/35 |
| 2015/0090810 A1* | 4/2015 | Lallement ............... F02K 1/763 239/265.19 |

FOREIGN PATENT DOCUMENTS

| | | |
|---|---|---|
| CN | 102858636 A | 1/2013 |
| CN | 103328801 A | 9/2013 |
| FR | 2 920 201 A1 | 2/2009 |
| FR | 2 939 924 A1 | 6/2010 |
| FR | 2 943 732 A1 | 10/2010 |
| WO | 2011/050289 A2 | 4/2011 |

OTHER PUBLICATIONS

International Search Report dated Apr. 10, 2015 for PCT/FR2014/053556, filed Dec. 24, 2014.
French Search Report dated Oct. 3, 2014 for FR 14 50114, filed Jan. 8, 2014.

* cited by examiner

METHOD AND COMPUTER PROGRAM FOR THE MONITORING OF A THRUST REVERSER HAVING HYDRAULIC ACTUATORS

FIELD OF THE INVENTION

The invention relates to the field of monitoring of an aircraft engine thrust reverser. In particular, the invention relates to a method and a computer program for the monitoring of a thrust reverser for detecting and predicting faults thereof.

STATE OF THE RELATED ART

In the prior art, a preventive maintenance operation consists of conducting an inspection of a machine, for example an aircraft engine thrust reverser, before a failure preventing the operation thereof declares itself, this inspection optionally resulting in the replacement of one or a plurality of parts of the machine. Obviously, in order to be effective from a preventive point of view and not to incur unnecessary costs, such an operation should not be carried out in an untimely manner but at a suitable time of the service life of the machine.

Therefore, as a general rule, it is sought to carry out effective monitoring of a thrust reverser capable of delivering a reliable maintenance report thus making it possible to optimise the maintenance operations on this reverser.

As such, from the patent application FR 2 943 732 A1, a method for monitoring a thrust reverser having an actuator controlled by an electric motor is known, said method using various types of parameters acquired during an operating phase of the thrust reverser:
representative parameters of the duration of this phase,
representative parameters of the energy in terms of the electric motor,
representative parameters of the torque in terms of the electric motor,
representative parameters of the duration during which the reference speed of rotation of the electric motor differs from the speed of rotation measured.

This method is applicable to an electric thrust reverser, not including hydraulic controls. As such, for a thrust reverser having hydraulic actuators, only the representative parameters of the duration of this operating phase could be used. However, such duration indicators can be strongly influenced by the external context of the motor (external temperature in particular). However, the interactions between endogenous data and exogenous data are not well known. As a result, this known method is not suitable for carrying out satisfactorily the monitoring of a thrust reverser having hydraulic actuators.

DESCRIPTION OF THE INVENTION

The aim of the invention is that of proposing effective monitoring of a thrust reverser having hydraulic actuators and proposes for this purpose, a method for monitoring an aircraft engine thrust reverser having stowable doors, the thrust reverser having hydraulic actuators and being equipped with switches arranged to each return a data item on the position of the doors, the engine comprising a computer configured to make measurements of a representative parameter of the position of the switches based on the data returned by the switches, characterised in that it comprises computation of one or a plurality of statistical indicators of the parameter measured and an analysis of the temporal progression of the statistical indicator(s) computed.

Some preferred, but non-limiting, aspects of the method are as follows:
the computation of one or a plurality of statistical indicators of the parameter measured comprises the determination of a mean of the measurements of the parameter and/or a median of the measurements of the parameters and/or a standard deviation of the measurements of the parameter and/or a distribution type of the measurements of the parameter;
the analysis of the temporal progression of a computed statistical indicator comprises the computation of a slope of the statistical indicator over a time window, or the comparison of the computed statistical indicator with a reference indicator previously computed on the basis of the measurements of the parameter made during thrust reverser operation considered to be sound;
the result of the analysis of the temporal progression of a computed statistical indicator is compared to a threshold, and a fault detection alert is issued in the event of overshoot of the threshold;
it comprises, in the event of overshoot of the threshold, the computation of a detected fault signature on the basis of the statistical indicator(s) computed and the comparison of the detected fault signature to one or a plurality of reference signatures each characteristic of a type of failure;
it comprises the computation, on the basis of the result of the analysis of the temporal progression of the statistical indicator(s) computed, of a probability of occurrence of a fault;
the parameter measured by the computer is a voltage ratio between the voltage divided by a voltage divider circuit and a power supply voltage of the voltage divider circuit.

The invention also relates to a computer program product comprising code instructions for executing the steps of the method according to the invention, when said program is executed on a computer.

BRIEF DESCRIPTION OF THE FIGURES

Further aspects, aims, advantages and features of the invention will emerge more clearly on reading the following detailed description of preferred embodiments thereof, given by way of non-limiting example, and with reference to the appended drawings wherein.

DETAILED DESCRIPTION OF PARTICULAR EMBODIMENTS

An aircraft engine comprises a control computer known as FADEC ("Full Authority Digital Engine Control") acting in real time on various actuators by the analysis and continuous processing of data compiled by multiple sensors such as switches.

A thrust reverser for such an engine comprises according to the prior art a plurality of stowable doors which are deployed during braking and closed during the other flight phases. Each door may be equipped with three switches having two states, open or closed, two switches being arranged so as to return a data item on the level of closure of the door and a switch being arranged so as to return a data item on the level of opening of the door.

In order to prevent any untimely opening of the doors, a plurality of safety measures are provided. Let us take the example of a reverser having two doors and having hydraulic actuators, it is then possible to have:

- A first safety measure consisting of S-shaped hooks (one on each door) the position whereof is detected by stow switches numbering two per hook. The hooks are actuated by a "Hydraulic Primary Lock" (HPL) and an "Electro-Hydraulic Primary Lock" (EHPL);
- A second safety measure consisting of PDA (for "Pivot Door Actuator") hydraulic actuators and featuring deploy switches for detecting the position of the doors (one switch per door);
- A third safety measure comprising a tertiary lock having an electric control independent of the other electric controls.

The data from the four stow switches and the two deploy switches are relayed to the FADEC computer so that said computer can determine the exact position of the doors of the thrust reverser.

In order to reduce the quantity of interconnection cables between the computer and the switches positioned at the doors of the thrust reverser, and thus reduce the weight of the overall system, use can be made of one or a plurality of circuits for detecting individual positions of switches. These circuits act as multiplexers to each supply to the computer on the same transmission channel a data item on the status of all the switches for which they are monitoring the position.

Figure 1:
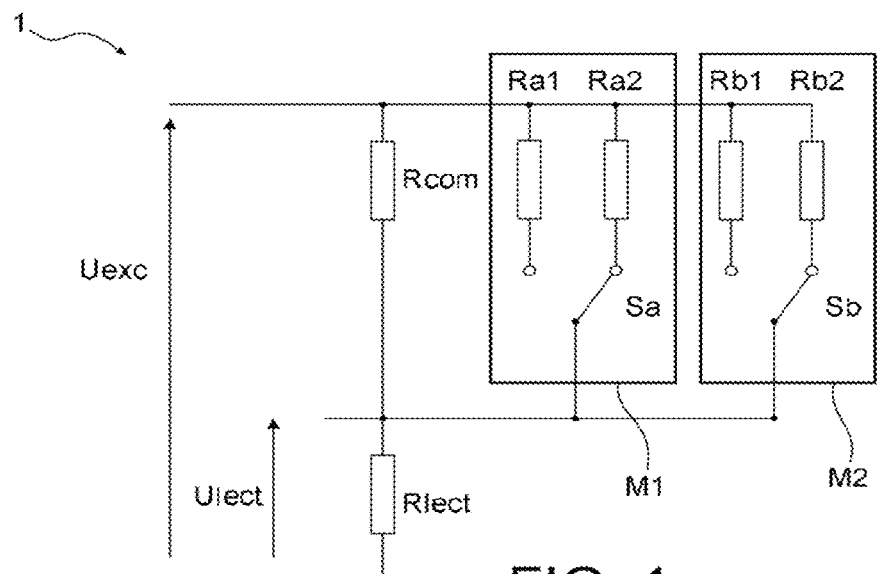
FIG. 1 illustrates a voltage divider circuit suitable for making a measurement of a representative parameter of the position of switches each arranged to return a data item on the position of a door of the thrust reverser.

Such a circuit, a detailed description whereof can be found in the patent application WO 2011/050289 A1, is embodied by a resistor circuit forming a voltage divider circuit. As represented in FIG. 1, such a voltage divider circuit 1 may comprise an output resistor Rlect in series with modules M1, M2 interconnected in parallel, each module comprising a switch Sa, Sb connected in series with a first module resistor Ra1, Rb1 or a second module resistor Ra2, Rb2 based on the position thereof, open or closed.

Figure 2:
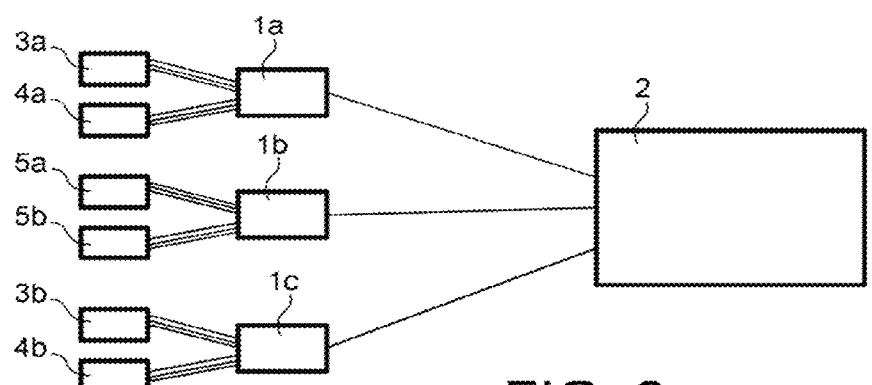
FIG. 2 is a diagram illustrating an example of connection between the various switches of a thrust reverser and the engine computer by means of voltage divider circuits of the type of that in FIG. 1.

With reference to FIG. 2, it should be noted that it is possible in particular to find three circuits 1a, 1b, 1c of the type of that illustrated in FIG. 1 for relaying the data from the various switches to the FADEC computer (a single channel whereof is represented herein): a first circuit 1a associated with the stow switches 3a, 4a of the first door, a second circuit 1b associated with the deploy switches 5a, 5b of the first and the second door, and a third circuit associated with the stow switches 3b, 4b of the second door.

The value of the voltage ratio between the voltage Ulect at the terminals of the output resistor Rlect and the power supply voltage Uexc of the voltage divider circuit 1 in FIG. 1 varies according to the positions of the switches Sa and Sb. These ratios are known with an estimated precision of 1%, and have characteristic values when the reverser is open or closed (in stabilised and non-transient phase). They further make it possible to give validity statuses to the switches Sa and Sb.

As such, by measuring a representative parameter of the position of switches each arranged to return a data item on the position of a door, such as for example this voltage ratio Ulect/Uexc of the voltage divider circuit in FIG. 1, the FADEC computer can determine the exact position of the doors of the thrust reverser.

The invention relates to a method for monitoring a thrust reverser having hydraulic actuators, for example a reverser having two stowable doors, equipped with switches arranged to each return a data item on the position of the doors. Within the scope of the invention, and with reference to FIG. 3, it is proposed to carry out the monitoring of the thrust reverser on the basis of measurements of a representative parameter of the position of switches made during a step E1 using the data returned by the switches, on the basis of the measurements of the voltage ratio described above without being restrictive for all that.

This method comprises a step E2 whereby the computation of one or a plurality of statistical indicators of the representative parameter measured during the step E1 is carried out, and a step E3 whereby an analysis of the temporal progression of the statistical indicator(s) computed is carried out.

The measurements of the representative parameter may be acquired during one or a plurality of operating phases of the reverser among a transient opening phase, a stabilised opening phase, a transient closing phase and a stabilised closing phase. As a general rule, the transient opening phase starts with the opening command and ends on the expiration of a first time delay. This is followed by the stabilised opening phase, followed by the transient closing phase which starts with closing command and ends on the expiration of a second time delay, followed by the stabilised closure phase.

The computation of statistical indicators and the analysis of the temporal progression thereof are specific to one operating phase. As such, if the four phases mentioned above are monitored, the computation of statistical indicators of the measured parameter is performed for each of the phases, and the analysis of the temporal progression of these representative statistical indicators during each of the phases is carried out.

According to the monitoring method according to the invention, the computation of one or a plurality of statistical indicators of the measured parameter representative of a monitored operating phase of the thrust reverser may comprise the determination of a mean of the measurements of the parameter and/or a median of the measurements of the parameter and/or a standard deviation of the measurements of the parameter and/or a distribution type of the measurements of the parameter (it is as such possible to verify that the measurements have a Gaussian distribution, for example using the chi-squared test), these measurements being made during the monitored operating phase.

The analysis of the temporal progression of a computed statistical indicator may in turn comprise the computation, typically by linear or polynomial regression, of a slope of the statistical indicator over a time window, for example a window of configurable duration.

This analysis may also comprise the comparison of the computed statistical indicator with a reference indicator previously computed on the basis of the measurements of the parameter made during thrust reverser operation considered to be sound. This comparison may be embodied by a computation of a standardised score such as a Z-score. This comparison may also be carried out for a plurality of computed statistical indicators so as to provide an overall score. The benefit of computing the score is that of characterising the status of the monitored thrust reverser, in the form of distance relative to sound operation.

This analysis may also comprise the computation of conditional probabilities of occurrence of faults, for example through a Bayesian network on the basis of the computed indicators, such a network having the advantage of enabling the introduction of prospective expert knowledge into the graph in addition to the experience acquired by means of the observation of the computed indicators.

Figure 3:
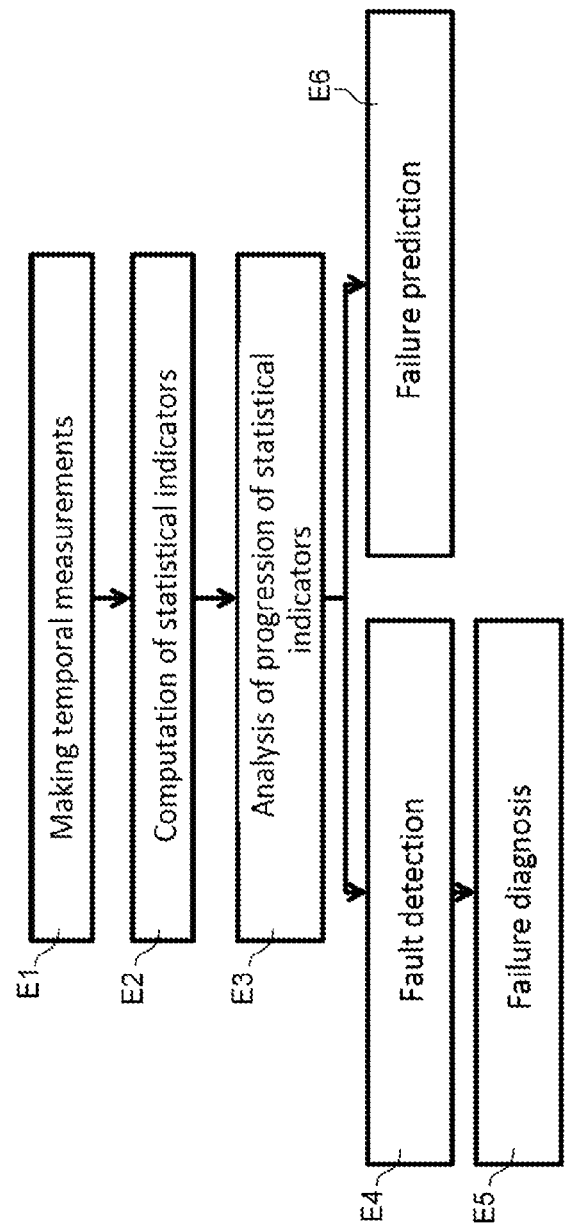
FIG. 3 is a flow chart illustrating the main steps of the monitoring method according to the invention.

The result of the analysis of the temporal progression of a computed statistical indicator may be compared to a threshold, and a fault detection alert may be issued in the event of overshoot of the threshold as represented by the step E4 in FIG. 3. By way of illustrative example, the slope of the statistical indicator over a time window may be compared to a threshold slope, an alert being issued in the event of overshoot of the threshold. Also by way of illustrative example, the deviation between a measured statistical indicator and the reference indicator thereof may be compared to a threshold, an alert being issued when this deviation exceeds the threshold. Once again by way of illustrative example, a fault detection alert may also be issued when a conditional probability of occurrence of a fault exceeds a certain threshold.

In one possible embodiment, the method according to the invention comprises a diagnostic step E5 for classifying the fault detected in the event of overshoot of the threshold and for locating the corresponding failure. This step E5 may comprise the computation of a detected fault signature on the basis of the statistical indicator(s) computed and the comparison of the detected fault signature to one or a plurality of reference signatures each characteristic of a type of failure. The reference signatures are typically recorded in a database. The reference signatures may comprise prospective expertise-constructed signatures, according to caricatural behaviour of the indicators in the event of a fault. The reference signatures may also be constructed retrospectively once a fault has been detected and the faulty component(s) identified.

In one possible embodiment, the method according to the invention comprises a prediction step E6 for predicting the future occurrence of a fault. This step E6 may notably comprise the retrospective computation of a probability of a fault according to the prospective probability of occurrence for each fault defined by expertise and the deviations between a signature of the current progression defined on the basis of the computed statistical indicator(s) and the reference signatures mentioned above each characteristic of a failure. This retrospective probability of occurrence thus makes it possible to compute an interval before encountering a given fault (the interval being expressed by a remaining operating time or a remaining number of actuation cycles of the reverser before having to carry out a maintenance operation), or to compute the probability of encountering a given fault over a given time-frame.

It should be noted that, as a general rule, the steps E3-E6 of the method according to the invention may be implemented according to the analysis techniques detailed in the patent FR 2939924 B1. And, according to one preferred implementation, the various steps of the method according to the invention are executed by means of program code instructions. Consequently, the invention also relates to a computer program product comprising code instructions for executing the steps of the method according to the invention as described above, when said program is executed on a computer. In particular, the method may be implemented equally well with an onboard computer program, for example in the FADEC, and with a computer program on the ground processing the measurements of the representative parameter, typically the measurements of the voltage ratio of a voltage divider circuit, acquired and recorded onboard, for example by the FADEC.

The invention claimed is:

1. A method for monitoring a thrust reverser of an aircraft engine, the thrust reverser having stowable doors and hydraulic actuators and being equipped with switches arranged to each return a data item on a position of the doors, the method comprising:
   measuring a representative parameter of a position of the switches based on the data items returned by the switches, wherein the measured representative parameter is a voltage ratio between a voltage divided by a voltage divider circuit and a power supply voltage of the voltage divider circuit, the voltage divider circuit comprising an output resistor in series with modules interconnected in parallel, each module comprising one of said switches connected in series with a first or a second module resistor based on the position of said switch;
   computing a statistical indicator of the measured representative parameter; and
   analyzing a temporal progression of the computed statistical indicator.

2. The method according to claim 1, wherein the computing the statistical indicator of the measured representative parameter comprises determining at least one of a mean, a median, a standard deviation, and a distribution type of the measured representative parameter.

3. The method according to claim 1, wherein the analyzing the temporal progression of the computed statistical indicator comprises computing a slope of the computed statistical indicator over a time window.

4. The method according to claim 1, wherein the analyzing the temporal progression of the computed statistical indicator comprises comparing the computed statistical indicator with a reference indicator previously computed based on measurements of the representative parameter made during sound operation of the thrust reverser.

5. The method according to claim 1, further comprising
   comparing a result of the analyzing the temporal progression of the computed statistical indicator to a threshold, and
   issuing a fault detection alert in an event of overshoot of the threshold.

6. The method according to claim 5, further comprising, in the event of overshoot of the threshold, computing a detected fault signature based on the computed statistical indicator, and comparing the detected fault signature to one or a plurality of reference signatures each characteristic of a type of failure.

7. The method according to claim 1, further comprising computing, based on a result of the analyzing the temporal progression of the computed statistical indicator, a probability of occurrence of a fault.

8. A computer program product comprising code instructions for executing the steps of the method according to claim 1, when said program is executed on a computer.

9. The method according to claim 1, wherein the measuring the representative parameter of the position of the switches is made during at least one operating phase of the thrust reverser including a transient opening phase, a stabilized opening phase, a transient closing phase, and a stabilized closing phase.

\* \* \* \* \*